June 30, 1959  R. A. HERMANN  2,892,667
RANGE AND BEARING SONAR RECORDING DEVICE
Filed June 3, 1955  2 Sheets-Sheet 1
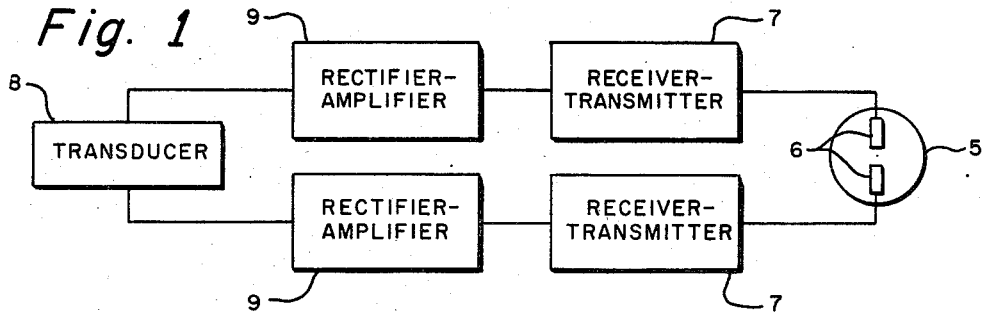
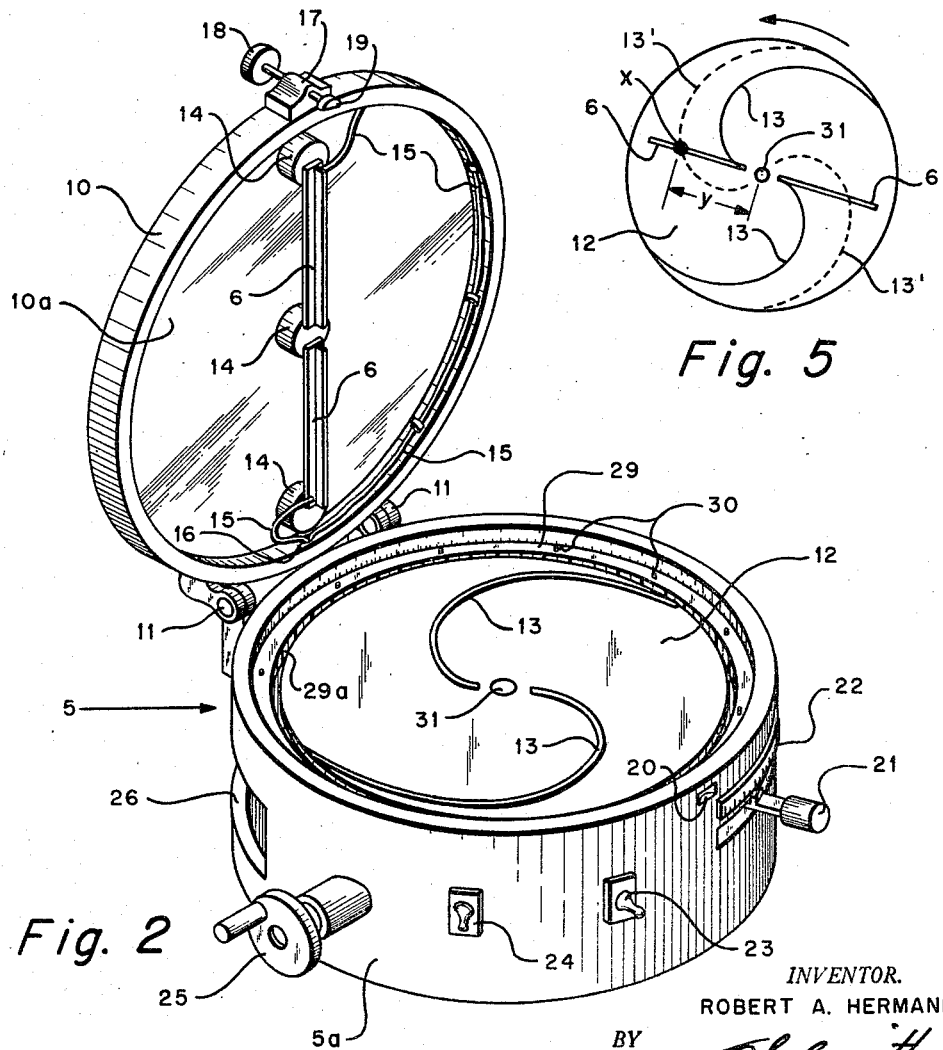
INVENTOR.
ROBERT A. HERMANN
BY
ATTORNEYS June 30, 1959 R. A. HERMANN 2,892,667
RANGE AND BEARING SONAR RECORDING DEVICE
Filed June 3, 1955 2 Sheets-Sheet 2

INVENTOR.
ROBERT A. HERMANN
BY
ATTORNEYS

United States Patent Office 2,892,667
Patented June 30, 1959

2,892,667

RANGE AND BEARING SONAR RECORDING DEVICE

Robert A. Hermann, Southampton, Pa., assignor to the United States of America as represented by the Secretary of the Navy Application June 3, 1955, Serial No. 513,175

8 Claims. (Cl. 346—74)

(Granted under Title 35, U.S. Code (1952), sec. 266)

The invention described herein may be manufactured and used by or for the Government of the United States of America for governmental purposes without the payment of any royalties thereon or therefor.

The present invention relates to a range and bearing sonar recording device and more particularly to a recording device which is capable of providing continuous recording on a flat, circular chart of electro-chemical sensitive paper of both ranges and bearings of a target.

Presently employed sonar recording devices record only range on a strip chart. Other known flat type circular presentations have utilized rotating arms carrying a stylus or a radially disposed helix rotating on its own axis. These devices have the disadvantages of mechanical complexity plus physical interference due to chart paper insertion or removal operations. In addition, in the case of the stylus type recorder, allowance for fly back time is required between sweeps.

This invention overcomes the above defects by utilizing a flat disc and a writing blade as the actual marking elements. Using this configuration, scanning is a continuous process and the inertia of the scanning disc also tends to provide a flywheel effect, ironing out speed variations produced by fluctuating mechanical loads or electrical supply voltage.

Briefly, the invention comprises a flat disc in which is embedded a helical electrode, a wiper blade spaced above the disc, and a flat disc-like paper rotatably mounted between the first flat disc having the electrode mounted therein and the wiper blade which is stationary. The rotation of the paper between the wiper blade and the electrode disc wheel permits a type of scanning operation which causes markings on the paper indicating both the azimuth position of the unknown object and its range, the latter of which is indicated by its distance from the center of rotation. This arrangement permits the continuous recording of an object relative to an observer stationed at the recorder as to azimuth and range which is easily readable and understood. A second embodiment of this invention makes the wiper blade rotatable and the paper stationary.

An object of the present invention is the provision of a recording device which is capable of recording both range and azimuth angle of an unknown object.

Another object is to provide a sonar recorder which is simple in construction and avoids the disadvantages inherent in the use of a stylus needle.

A further object of the invention is the provision of a recording device utilizing electro-chemical sensitive paper and spiral scanning electrodes which rotate and provide sweep and range.

Still another object is to provide a recording mechanism which eliminates the need for flyback time and which continually sweeps.

The final object of the present invention is the provision of a flat type circular recording device having a stationary electro-chemical sensitive paper, and rotatable electric writing blades as the actual marking elements.

The exact nature of this invention as well as other objects and advantages thereof will be readily apparent from consideration of the following specification relating to the annexed drawings in which:

Fig. 1 is a block diagram showing the recording device which is the subject of this invention being utilized in a typical sonar system;

Fig. 2 illustrates an isometric view of one specific embodiment of the recording device with its top in the open position;

Fig. 5 shows diagrammatically the relationship between the marking elements and the helical electrodes.

Figure 3:
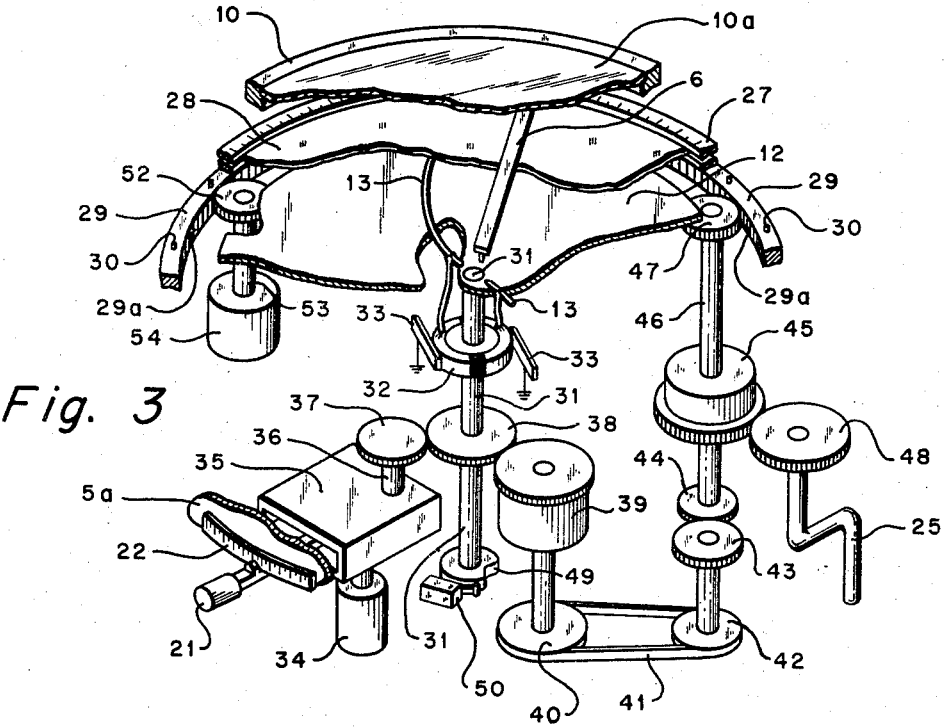
Fig. 3 shows schematically the mechanical details of the preferred embodiment of the recording head of Fig. 2.

Referring now to the drawings, wherein like reference characters designate like or corresponding parts throughout the several views, there is shown in Fig. 1 a typical arrangement of the recording head in a sonar system. The recording head 5 contains stationary wiper blades 6 which are electrically connected to receive the signals from the receiver-transmitters 7. Transducer 8, it should be noted, delivers the signals to rectifier-amplifiers 9 which in turn transmit the signal to receiver-transmitters 7. In the arrangement illustrated in Fig. 1, the system is dual in nature, that is, the transducer includes a pair of active transducer elements arranged back to back to sweep two areas 180 degrees apart, since a pulse emanating from the transducer is directed in opposite directions therefrom simultaneously. Of course, a recorder of this invention with a single wiper 6, a single acting transducer 8, a single receiver-transmitter 7 and a single rectifier-amplifier 9 may be used, although it has been found more efficient to use a double acting system as shown, so that twice as many scanning operations are performed at any given point during a single rotation of the transducer.

A transducer is a device for converting energy from one form into another. As used in a sonar system, the transducer operates to convert a pulse of electrical energy into a sound pulse transmitted through water in which the transducer is submerged. The transducer is highly directional, sending the signal in the form of a narrow beam. If an object in the water intercepts the signal, there is reflected a sound wave which the transducer senses and converts to an electric impulse which is recorded by the recording device of this invention. The transducer is well known, as is the general sonar system illustrated in Fig. 1.

Fig. 2 illustrates the recording unit 5 of this invention having an outer casing 5a and a top cover 10 which swivels on hinges 11. Cover 10 is provided with a glass face 10a permitting observation of the recording operation. Mounted in the casing 5a is a rotatable disc or turntable 12 of dielectric material having mounted therein a pair of helically shaped electrodes 13. The disc 12 is supported at its center for rotation by a shaft 31. Between the outer circumference of the disc 12 and the casing 5a is located a ring 29 not touching either the casing 5a or the disc 12 and having gear teeth 29a along the inner surface thereof and extending below the disc 12. The ring 29 is provided with a plurality of pin-like projections 30 on its top surface, and is suspended so as to permit rotation independently of both the casing 5a and the disc 12 for reasons hereinafter explained. In the cover 10 a pair of stationary wiper blades 6 are insulated and directly supported by ceramic or other type insulating blocks 14. The outer ends of wiper blades 6 are connected to a pair of wires 15 which pass through opening 16 in the cover rim 10. Cover 10 is provided with a bracket 17 supporting a latch 18 having a half-moon lug 19 for mating with slot 20 in casing 5a for holding the cover 10 closed.

Mounted in casing 5a is a gear ratio changing lever 21 capable of lateral movement and having an indicator scale 22, explained below. Also provided in the casing 5a are two electrical switches 23 and 24, respectively, a hand wheel 25, and an access hole 26.

Fig. 3 illustrates schematically the mechanical arrangement of the inner details of the recording head shown isometrically in Fig. 2. Shown is the cover rim 10 with the glass center portion 10a and the ring 29 having gear teeth 29a and projections 30 for supporting frame 27 which holds the electro-chemical paper 28. The frame 27 is provided with a scale indicating degrees. Broken away is a portion of the disc 12 having mounted therein the electrodes 13. A single wiper 6 is also shown. The disc 12 is mechanically connected through shaft 31 to the commutator ring 32 having brushes 33 connected to ground. The drive for disc 12 is from an electric motor 34 through a gear or ratio changing device 35 of conventional design having ratio changing lever 21 and dial 22 connected through shaft 36 to pinion 37 and gear 38. It will be noted from the drawing that gear 38 is directly shafted to commutator ring 32 and disc 12.

For reasons explained further below the ring 29 which supports the electro-chemical paper 28 and its frame 27 is also driven mechanically by the motor 34. Provided for this purpose and connected to gear 38 is the electro-magnetic clutch 39. The clutch 39 is connected by pulley wheels 40, 42 and belt 41 to gears 43 and 44, a conventional differential 45 and shaft 46 to pinion 47 which engages teeth 29a. Manual crank 25 is connected through pinion 48 to the outer portion of differential 45. Connected directly to the disc 12 through shaft 31 is a pulsing cam 49 which actuates the keying switch 50, for reasons explained further below.

A gear 52 engaged with ring 29 is connected by shaft 53 to a synchro control transformer 54 which is well known in the art as a device to control remotely the speed of a motor. The transmitter 54 controls a motor (not illustrated) driving the transducer so that the paper frame 27 and the transducer always rotate in a coordinated one to one relationship. The paper 28 is supported by frame 27 which is locked on the ring 29 by projections 30. It will be noted that paper 28 rotates in the same direction as the disc 12.

Figure 4:
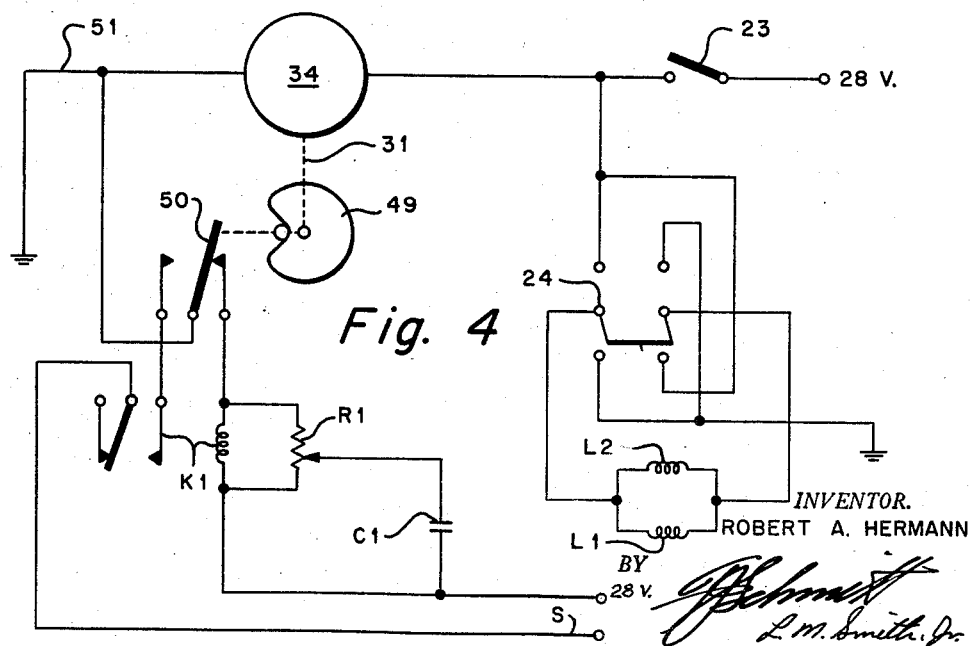
Fig. 4 illustrates the circuit diagram which is used in connection with the recording device of Figs. 2 and 3.

Fig. 4 illustrates the electrical wire diagram for the recording device described above. Electric motor 34 is mechanically connected by shaft 31 to pulsing cam 49 to actuate keying switch 50, as already noted. The motor 34 is connected electrically through On-Off switch 23 to a source of 28 volt supply. The opposite side of the motor 34 is connected through lead 51 to ground. Switch 24 is of the double-throw type and is connected to control the operation of electro-magnetic clutch 39. In a first position of switch 24 the electro-magnetic clutch 39 is engaged and in a second position of the switch 24 the electro-magnetic clutch 39 is disengaged. Switch 50 controls the operation of a time delay circuit consisting of resistance $R_1$ and capacitor $C_1$. This circuit comprises a conventional pulse controller (time delay circuit) including the relay $K_1$ which by means of the adjustment at $R_1$ controls the duration of the ungrounded condition of the lead S initiated by movement of the switch 50 in response to cam 49 to the position illustrated in Fig. 4. Thus, the lead S may be connected to the transducer system to control the initiation and the duration of the electrical pulse which activates the transducer 8.

The recorder device functions as follows: Electric motor 34 drives at a constant speed the disc 12 having embedded therein the helical electrodes 13. Lever 21 controls the transmission ratio between the disc 12 and the electric motor 34 so that the disc 12 may be set to rotate at any one of several speeds. It will be noted that the paper 28 is located between the stationary wiper blades 6 and disc 12. Also connected to rotate with disc 12 is the cam 49 connected to keying switch 50. The action of cam 49 is synchronized with the rotation of disc 12 so that as the helical blades 13 embedded therein reach a position tangent with wiper blades 6 at the center of rotation of disc 12, as shown in solid lines, Fig. 5, switch 50 is keyed to produce a pulse which is transformed into a sound pulse by the transducer 8. When this sound pulse is reflected by an unknown object, the transducer senses the reflected wave and converts it to an electric pulse. This reflected electric pulse then passes through the stages 7 and 9 in Fig. 1 to the particular wiper blade 6 which is on the same side of the system as the transducer 8 producing the pulse indicative of reflected sound waves. Since the disc 12 has rotated through an angular distance dependent upon how long a period it took for the sound wave to reach the unknown object and then return to the transducer 8, the electrical pulse will pass to the electrode 13 (shown in broken lines) at a point X, marking the paper 28 at this point, and thence to ground through commutator 32. The electrode 13 is wound helically so that each point on the electrode is at a radial distance from the center of rotation proportional to the angular displacement of disc 12 supporting the electrode 13 relative to the fixed wiper 6 during this time interval. Thus, at point X, the distance $y$ is proportional to the distance separating the unknown object causing the sound wave reflection and the transducer 8, since the angular displacement of the disc 12 during the interval between the initiation of the sound pulse and the receipt at the wiper 6 of a signal initiated by a reflected sound wave is necessarily proportional to the distance between the unknown object and the transducer 8.

More particularly, as described above, when the electrodes are positioned such that the straight electrodes or wipers 6 are tangent to the spiral electrodes 13 at the center 31 of rotation of the disc 12, a pulse is sent out by the transducer 8, shown in Fig. 1, in response to operation of the cam controlled switch 50, shown in Fig. 4 in greater detail than in Fig. 1. After a finite interval of time representing the time it takes for the sound from the transducer 8 to reach the target and to be returned as reflected sound waves, disc 12 has been rotated through a certain angular displacement which is a function of the duration of this finite interval of time and is determinative of the location of the point X radially of the straight electrode 6 now intersecting the helical electrode 13 which has been displaced to the position indicated in broken lines in Fig. 5. Since the rate of travel of the sound waves through the intervening medium is the principal factor determinative of the duration of the finite time interval this angular displacement of the disc 12 is thus representative of the intervening distance or range.

By employing proper gear ratios, the paper is caused to rotate at a rate which is a sub-multiple of that of disc 12. In one particular arrangement, the rotation of the paper 28 and disc 12 were synchronized so that at each 15° of movement of paper 28 the disc 12 would rotate 180°. The paper frame 27 was indexed or marked at 15° intervals and each time an index mark lined up with the wiper blades 6, the disc 12 would reach a position where the helical electrodes 13 were tangential to the wiper blades 6, as shown in solid lines, Fig. 5. It is thus seen that the point X marked on paper 28 has a double significance. First, the distance $y$ to the center of the paper represents the range of the unknown object, for reasons already explained. Second, since the paper 28 rotates in synchronism with transducer 8, the angular location of point X on paper 28 relative to any convenient predetermined reference azimuth such as north, for example, indicates the bearing to the unknown object from the transducer measured from the predetermined reference azimuth. After the transducer has made several revolutions and swept the unknown object a corresponding number of times it will be seen that a permanent record has been made of the relative movement of the object with respect to the transducer. This is useful since this information could be used, among other purposes, to make predictions as to future positions of the object.

Further considering the exemplary rates of rotation of the paper 28 and the disc 12 it will be noted that the disc 12 completes twelve revolutions for each revolution of the paper 28 and the corresponding revolution of the transducer 8 necessary to scan the full 360 degree field of search surrounding the transducer. Thus, the azimuth orientation of the transducer 8 relative to a predetermined azimuth reference, such as north, at which sound waves are reflected from an unknown object producing a point X on the chart is indicated by the coordinated angular displacement of the paper 28 relative to the same predetermined azimuth reference. As a result of this continuous coordination of the positions of the transducer 8 and the paper 28, the position of the point X on the paper 28 relative to the predetermined azimuth reference is therefore indicative of the bearing of an unknown object from the transducer 8.

Due to the relatively slow rate of movement of paper 28, the angular error due to the movement of paper 28 during the interval between transmission and reception of the sound signals by the transducer is small and may be disregarded. For more accurate measurement, instead of using index markings on frame 27, the paper may be lined with slightly curved radial lines at 15° intervals to compensate for this error. In order to align the paper with the transducer initially, the transducer is provided with a bearing repeater (not illustrated) located near the recorder for indicating transducer beam axis position. Thus, when the frame 27 is placed on ring 29, it may be properly orientated with respect to transducer 8. Such a dial is conventional and well known in the art.

In order to vary the maximum effective range of this device, all that is required is to change the rate of rotation of disc 12. If, for example, disc 12 is doubled in speed along with paper 28 then the effective range of the recording device halves because the disc 12 makes its 180° rotation in one-half the time. Thus, lever 21, which varies the transmission ratio between disc 12 and paper 28 on the one hand, and motor 34 on the other hand, is useful to vary the range of the recording device.

In the manual operation of the recording device 5, switch 24 is thrown to disengage magnetic clutch 39. Manual crank 25 is connected through the differential 45 to rotate the ring 29 supporting the paper 28. Since transducer 8 is also driven and synchronized with the movement of paper 28 through gear 52, shaft 53, and synchro control transformer 54, it will be apparent that no matter through what angle the paper is rotated transducer 8 will always be synchronized therewith. Manual operation permits concentration on a particular target or sector.

When the electro-magnetic clutch 39 is engaged, for normal automatic operation, the hand crank 25 is able to perform the function of orientating the paper 28 with respect to the disc 12 so that when wiper blades 6 are aligned with electrodes 13 at their zero range position, shown in Fig. 5, the paper is also aligned on a 15° position. The differential 45 is irreversible as is well understood in the art and permits this type of adjustment.

It will be noted, as pointed out above, that in the arrangement shown, the recorder is double acting. That is, the transducer sends out two signals simultaneously at 180 degrees apart. Therefore, the recorder device 5 functions to pass two signals in response to sound waves reflected from each unknown object or target during one complete revolution of the transducer 8. In fact, in the event that two separate targets are disposed 180 degrees apart relative to the transducer 8 the reflected sound waves from the respective targets may give rise to two signals corresponding to these respective targets received at the respective wipers 6 of the recording device simultaneously. It is obvious that the recording device can be designed for a single wiper blade 6 and a single electrode 13 which will give essentially the same operation, except that a given target will be scanned only once in a 360 degree revolution of the transducer 8.

It is apparent, in the embodiment described above, that the paper 28 does not have a physical orientation with the target area because of its continual rotation. A modification of this invention would be to provide a stationary paper frame for the paper which would function as a map of the area. Instead of rotating the paper 28, the wiper blades 6 may be rotated in synchronism with the transducer 8. A separate commutator ring would be required for the wiper blades 6 but the paper could be aligned with true north or any reference bearing and give direct indications of the target location. In this construction, it will be noted that the wiper blades 6 would be connected to a ring gear driven by motor 34 and the transducer 8 would be rotated by a gear connected to the frame supporting the wiper blades 6, similar to the construction of Fig. 3. A separate manual crank would, of course, be provided for orientating the paper 28 properly and adjusting for movement of the vehicle supporting the recorder. The configuration of the paper could be such that it may be fed between the electrodes continuously from one role to another thus obviating the manual operation of chart removal. The arrangement could be designed so that the circular paper 28 is an imprint on a roll of paper and the successive sheets of paper can be fed from one roller to another.

The recording device of this invention has been described in connection with a sonar system. It is evident, however, that it may be particularly useful as a recording device in a radar system, or the like, or as a navigational aid. In addition, the recording device of this invention may be used as a facsimile device or wherever it is desired to record the changes in two independent variables. The paper disc of this device in effect records information on polar coordinates, and consequently, this device affords the opportunity to record automatically on polar coordinates information particularly useful in this form. This would include the conversion of variables from rectangular coordinates to polar coordinates.

Obviously, many modifications and variations of the present invention are possible in the light of the above teachings. It is, therefore, to be understood that within the scope of the appended claims the invention may be practiced otherwise than as specifically described.

What is claimed is:

1. A facsimile recording device comprising, a first rotatable disc having a first electrode mounted therein, a second rotatable disc having a second electrode mounted therein, said second disc being parallel to and in close proximity with, but not contacting said first disc, and stationary electro-chemical paper mounted between said first and second rotating discs for conducting electrical impulses between said electrodes, motor means to drive said discs at different constant speeds, and means to disconnect said second disc from said motor to drive said second disc manually.

2. A recording device comprising, a first rotatable disc having a first electrode mounted therein and extending from the center of rotation of said disc and winding to the circumference thereof, a second stationary electrode spaced from said disc and which is straight and extending from a point opposite the center of rotation of said first disc to a point opposite the circumference thereof parallel to said first disc, a circular section of electro-chemical paper mounted for rotation between said first and second electrodes, means to maintain a definite speed relationship between said first disc and said paper, and means to vary the speed of said first disc and said paper without affecting said speed relationship therebetween.

3. A recording device comprising, a first rotatable disc having a first electrode mounted therein and extending from the center of rotation of said disc and winding to the circumference thereof, a second stationary electrode spaced from said disc and which is straight and extending from a point opposite the center of rotation of said first disc to a point opposite the circumference thereof parallel to said first disc, a circular section of electro-chemical paper mounted for rotation between first and second electrodes, means to maintain a definite speed relationship between said first disc and said paper, means to vary the speed of said first disc and said paper without affecting said speed relationship therebetween, means to supply an input signal to said stationary electrode, and means to carry away said signal from said first electrode after said signal passes from said stationary electrode through said paper to said first electrode.

4. A device for recording an incoming impulse comprising, a first rotatable disc having a first electrode mounted therein, a second stationary electrode parallel to and in close proximity but not contacting said first disc, a circular section of electro-chemical paper mounted for rotation between said first and second electrodes, means to maintain a definite speed relationship between said first disc and said paper, means rotating in synchronization with said first disc for initiating a transmitting impulse effecting remotely said incoming impulse, means for receiving and passing said incomng impulse including in sequence said second electrode, said paper, said first electrode, and slip ring means connected to said disc to transfer said incoming signal out of said recording device.

5. A range and bearing sonar recording device comprising, a scanning disc having a plurality of integrally mounted spiral electrodes, a constant speed motor driving said disc, an elongated writing blade spaced directly above and radially extending along said disc, electrochemical paper disposed between said disc and said blade whereby an electrical signal on said blade forms an electrical circuit through said paper to a contacting point on said spiral electrodes, a rotatable frame supporting said paper for rotation therewith, means including said motor to rotate said frame, manual means to drive said frame independently of said motor, means to impress signals on said writing blade, and commutator means in series with said spiral electrodes for carrying away said signals.

6. A facsimile recording device comprising, a first rotatable disc having an electrode embedded therein, a stationary electrode parallel to and in close proximity with, but separated from, said first disc, a second disc of electro-chemical paper mounted for rotation between said first disc and said stationary electrode for conducting and recording electrical impulses between said electrodes, variable drive means for said first rotatable disc, means for driving said second disc at a constant speed ratio with respect to said first disc, means to vary said ratio and means for selectively altering the orientation of said paper disc with respect to said rotatable disc while said discs are rotating.

7. A facsimile recording device comprising, a first rotatable disc having an electrode embedded therein, a stationary electrode parallel to and in close proximity with, but separated from said first disc, a second disc of electro-chemical paper mounted for rotation between said first disc and said stationary electrode for conducting and recording electrical impulses between said electrodes, variable drive means for said first rotatable disc, means for driving said second disc at a constant speed ratio with respect to said first disc, means to vary said ratio, and means for selectively altering the orientation of said paper disc with respect to said first rotatable disc while said discs are rotating.

8. A facsimile recording device comprising, a flat, circular first rotatable disc having an electrode embedded therein, a radially extending stationary electrode parallel to and in close proximity with, but separated from, said first rotatable disc, a second disc of electro-chemical paper mounted for rotation between said first rotatable disc and said stationary electrode for conducting and recording electrical impulses between said electrodes, variable drive means for said first rotatable disc, means for driving said first rotatable disc and said second disc at a constant speed ratio, and means for selectively altering said ratio and the orientation of said discs with respect to each other.

References Cited in the file of this patent

UNITED STATES PATENTS

| | | |
|---|---|---|
| 863,281 | Jaeger | Aug. 13, 1907 |
| 2,215,806 | Young | Sept. 24, 1940 |
| 2,560,247 | Rich | July 10, 1951 |

FOREIGN PATENTS

| | | |
|---|---|---|
| 50,811 | Netherlands | Aug. 15, 1941 |